March 22, 1966     J. BOEHM     3,241,240

APPARATUS FOR PLOTTING FUNCTION GENERATING CURVES

Filed Jan. 7, 1964     2 Sheets-Sheet 1

Josef Boehm,
INVENTOR.

BY Harry M. Saragovitz
Edward J. Kelly
Herbert Berl
William P. Heath, Jr.

March 22, 1966     J. BOEHM     3,241,240
APPARATUS FOR PLOTTING FUNCTION GENERATING CURVES
Filed Jan. 7, 1964     2 Sheets-Sheet 2

Josef Boehm,
*INVENTOR.*

BY Harry M. Saragovitz
Edward J. Kelly
Herbert Berl
William P. Heath, Jr.

United States Patent Office 3,241,240
Patented Mar. 22, 1966

3,241,240
APPARATUS FOR PLOTTING FUNCTION GENERATING CURVES
Josef Boehm, Huntsville, Ala., assignor to the United States of America as represented by the Secretary of the Army
Filed Jan. 7, 1964, Ser. No. 336,325
7 Claims. (Cl. 33—26)

The invention described herein may be manufactured and used by or for the Government for governmental purposes without the payment of any royalty thereon.

This invention relates generally to plotting devices, and more particularly to a device for producing function generating curves on a cam blank quickly and sufficiently accurate for laboratory investigations in the field of analog simulation. The plotting device herein described will produce specific cam profiles with a high degree of accuracy by exactly simulating the actual cam drive with which the finished cam is to be used. The cam blank or work piece is marked with the device at numerous selected intervals, as indicated by values taken from a deflection diagram, to outline the desired contour of the cam. The marking of the cam blank is done by means of an adjustable marking device that produces circles on the cam blank which have the same diameter as the cam follower roller to be used with the particular cam being constructed. The circles are marked on the cam blank at selected intervals until one complete revolution of the cam has been plotted. The function generating curve is produced as the inner envelope of all the circles which represent the several positions of the cam follower roller on the cam blank during one 360° revolution.

It has been customary heretofore to produce function generating curves by imprinting the roller circles in the surface of a cam blank by manually following as closely as possible the contour of the roller with a sharp scribe. It is thus seen that it was quite difficult to maintain the longitudinal axis of the scribe in any one position parallel to itself in any of other positions as the circle was produced. Any deviation from this parallelity resulted in less accuracy in the finished cam. Further difficulty is encountered with the holding fixture for the roller. The holding fixture is pivoted in the cam blank center and consists essentially of a beam relative to which the roller is displaced in percent of the total travel occurring during one full revolution of the cam. The roller center, in this arrangement, always moves on a straight line which runs through the center point of the cam blank. The angular orientation is given by a 360° circular scale on the rim of the base plate to which the cam blank is attached and the beam carrying the roller is aligned relative to the scale. This arrangement therefore can not produce a true plotting of the relative roller positions for followers oscillating about a pivot since the center of an oscillating roller moves along an arcuate path while the center of the roller in a holding fixture, as described above, is displaced on a straight line thereby distorting the functional relationship between input and output motion for the oscillating follower type of cam drive.

An object of the present invention is to provide a device which will accurately and quickly plot contours of function generating curves on cam blanks for oscillating follower type cam drives. The above and other objects and tthe novel features of this invention will be apparent from the following description taken with the accompanying drawings, in which.

Figure 1:
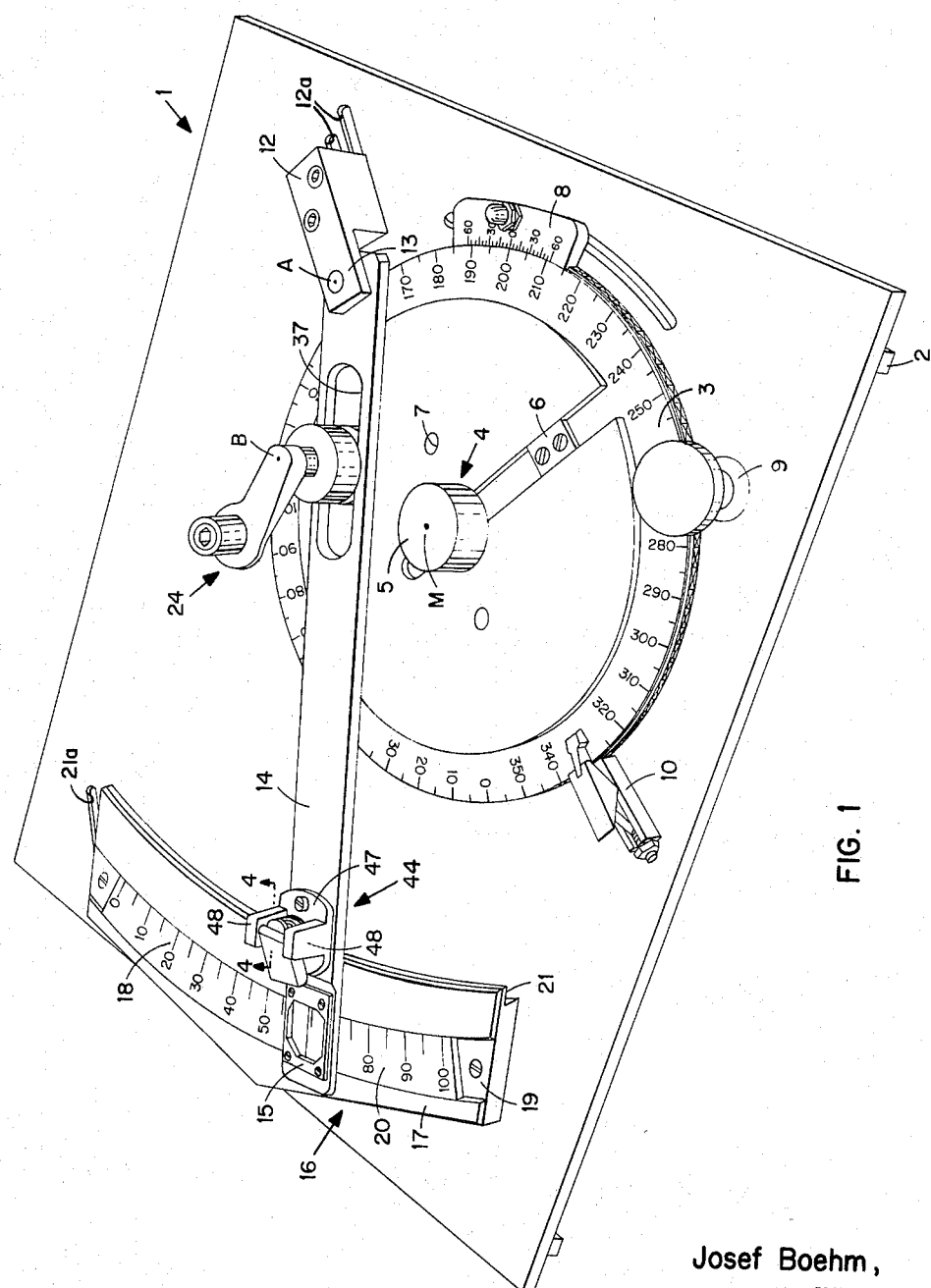
FIGURE 1 represents a perspective view of one embodiment of the plotting assembly of the present invention.
Figure 3:
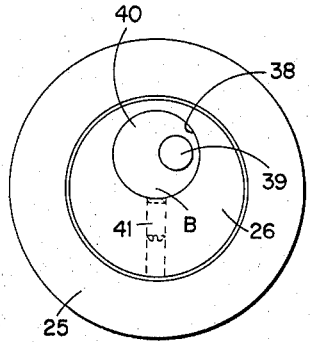
FIGURE 3 represents a view of the marking assembly of the present invention taken along line 3—3 of FIGURE 2.
Figure 2:
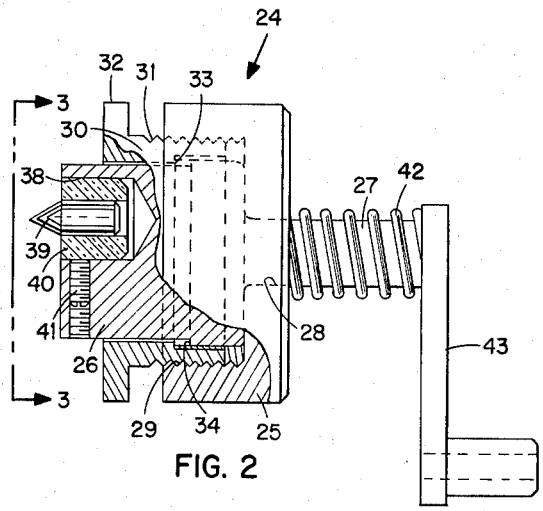
FIGURE 2 represents a partial section of the marking assembly of the present invention.
Figure 4:
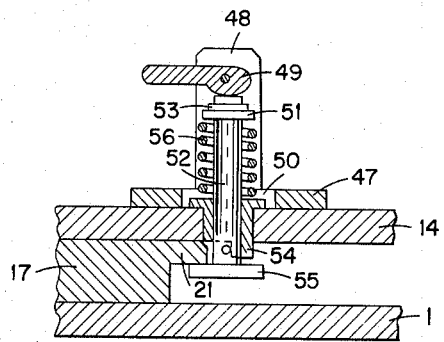
FIGURE 4 represents a section of the clamp of the present invention taken along line 4—4 of FIGURE 1.

The plotting apparatus comprises a generally planar base member 1 having a plurality of supports 2 attached to the underside thereof. A flat plate member 3 is rotatably mounted over the upper side of the base member on a spindle assembly 4. The spindle 4 is provided with threads (not shown) on its free end to receive a knob 5 thereon. The knob is removed from the spindle when a cam blank or workpiece is placed thereover and then tightened against the cam blank to hold the same in a fixed position on the plate 3. The plate is further provided with a rectangular projection 6 set with its longitudinal axis lying along a radial line one the plate so that the slot in the cam blank, as shown in FIGURE 1, will receive the projection to thereby positively prevent rotation of the cam blank with reference to the plate 3. The projection may be attached to the plate by means of screws or equivalent fastening means. There is a small cylindrical projection 7 extending upwardly from plate 3 disposed to fit in a cylindrical opening in a cam blank to insure proper positioning of the cam blank on the plate.

A 360° circular scale is calibrated around the rim of the plate 3 to indicate the angular orientation of the cam blank mounted on the plate. A vernier attachment 8 is adjustably mounted on the base for movement relative to the outer edge of the plate 3 on a pivot axis coincident with the center of curvature of the calibrated rim. The vernier attachment is provided to assist the operator of the plotting apparatus in the fine adjustment of the plate and cam blank relative to a reference point as indicated by values on the deflection diagram. A conventional friction wheel assembly 9 is mounted on the base and in contact with the rim of the plate 3 for use in rotating the plate and cam blank thereon to desired positions. A clamping device 10 is mounted on the base adjacent plate 3 and is adapted to be moved into and out of contact with the plate to hold both the plate and cam blank in a desired position with reference to the base.

A generally rectangular mounting member 12 is adjustably mounted in a pair of slots 12a disposed in the base radially of the plate. Member 12 is disposed for movement radially of the plate and is provided with a flange 13 extending toward the center point of the plate 3. An arm 14 is pivotally attached to the flange 13 at point A for selected movement over and parallel to the planar surface of the plate and cam blank. The pivot point of arm 14 can be adjusted either radially away from or toward the center point M of the plate by simply moving the mounting member 12 in the desired direction in slots 12a provided in the base. This adjustment will permit duplication on the plotting assembly of the distance between the center of rotation of the cam blank and the pivot point A of the arm. The distance therebetween would equal the actual distance between the center of rotation of the finished cam and the pivot point of the follower arm in a cam drive used with the finished cam.

The arm 14 extends from the pivot point A across a portion of the plate 3 to an indexing assembly 16 which is adjustably mounted on the base in a pair of slots 21a disposed in the base radially of the plate in parallel relation with slots 12a. The arm 14 is further provided with an indicator 15 which is disposed on the free end thereof. The indexing assembly comprises an elongated bar member 17 having a percentage scale 18 calibrated on the upper surface thereof. The bar 17 is adjustably mounted on the base in slots 21a and can only be moved along an axis that is parallel to the axis of movement of the mounting member 12. The bar has an arcuate groove 19 cut therein to slidably receive an arcuate strip 20, the strip having the same degree of curvature as the groove. The strip is adjustable along the groove thus permitting the scale 18 to be adjusted along bar 17 as required so that cam blanks of several sizes may be used on the plotting device. The inner edge of the bar is arcuate and is provided with an arcuate flange 21 extending toward the mounting member 12, the flange being spaced above the base member to cooperate with locking means 44 mounted on the arm 14. The arc along which the scale 18 is calibrated has the pivot point A as its center of curvature as does the arc defined by the arcuate flange on the indexing assembly. The arm 14 extends from the pivot point A of the mounting member 12 to the indexing assembly 16 and is provided with locking means 44 which serves the dual function of locking the arm in position over the scale 18 and abutting the arcuate flange 21 in all positions to maintain a predetermined distance between the entire indexing assembly and the pivot point A on the mounting member. When the mounting member is moved with reference to the center of rotation of the cam blank the indexing assembly must also be moved in the same direction for an equal distance to maintain, at all times, the relationship between the pivot point A on the mounting member 12 and the percentage scale 18 calibrated on the strip 20. This adjustment is made rapidly and accurately by first positioning the mounting member 12 in a desired position in slots 12a and then moving the arcuate flange 21 of the indexing assembly in slots 21a until the flange 21 is in contact with the locking device 44. The constant relationship between the scale 18 and the pivot point A about which the arm 14 pivots must be maintained at all times since the index scale 18 indicates percent of deflection of the cam follower which would occur at any given angular position. The cam follower is simulated by a marking device 24 adjustably mounted on the arm 14 intermediate the ends thereof to permit the exact duplication on the plotting assembly of the length of the follower arm that is to be used with the finished cam.

The cam marking device 24 is adjustably mounted on arm 14 and comprises a hollow cylindrical housing 25 having one end thereof open. A cylindrical member 26 is mounted in the housing and is disposed for both rotatable and axial movement within the housing. The cylindrical member 26 is provided with a shaft 27 extending upwardly from the upper surface thereof and through an opening 28 formed in the top portion of the housing 25 in which it is mounted. The hollow housing 25 is further provided with threads 29 around the inner surface thereof to receive a collar 30. The collar is provided with threads 31 around the upper end and an outwardly extending annular flange 32 at the other end. There is a shoulder 33 formed around the inner surface of the collar located generally half way between the ends thereof. The cylindrical member 26 is provided with an annular shoulder 34 intermediate the ends thereof which will be engaged by the shoulder 33 on the collar 30 when the cylindrical member 26 is pushed away from the top wall of the housing 25 and thereby retains the cylindrical member 26 in the housing 25. The marking assembly 24 is adjustably mounted in a slot 37 formed in the arm 14 by utilizing the lower end of the housing to bear on the upper side of the arm 14 and tightening the flange 30 against the underside of the arm. This releasable attachment permits adjustment of the marking device along the longitudinal axis of the arm 14 whereby the exact length of a follower arm can be duplicated on the cam plotting assembly.

The cylindrical member 26 is further provided with a cylindrical opening 38 offset from the center of rotation thereof to receive a marking tip 39. The marking tip 39 is eccentrically mounted in a second cylindrical member 40 which is mounted for rotatable adjustment within the opening 38 formed in cylindrical member 26. The second cylindrical member 40 is held in position through the use of a set screw 41 mounted in the cylindrical member 26 in a conventional manner. A coil spring 42 is placed over the shaft and between the top of housing 25 and the crank handle 43 which is attached to the free end of the shaft to urge the cylindrical member 26 upwardly into contact with the upper wall of the housing 25 when the device is not in use. It is noted that the marking tip 39 is held out of contact with the cam blank by the spring 42 when no roller circle is being imprinted therewith.

A clamp 44 is positioned on the arm 14 and is arranged to engage the underside of the flange 21 to lock arm 14 in position at any desired point along the scale 18. The clamp 44 includes a housing having a plate-like portion 47 mounted on arm 14, a pair of upstanding members 48, attached to the plate-like portion, a cam member 49 mounted between the two members 48 and extending through the central opening 50 in plate-like portion 47. A washer 51 is attached to the end portion of shaft 52 adjacent the cam member 49 and is held in place by a lock ring 53. A bearing 54 is mounted in an opening formed in arm 14 and is disposed to slidably receive the lower portion of shaft 52 therethrough. The other end of shaft 52 is provided with a tip 55 arranged to engage the underside of the flange 21 to lock arm 14 thereto. A spring 56 is positioned around the shaft 57 between the washer 51 and the bearing 54 for the purpose of urging shaft 52 upwardly and thereby bringing the tip 55 into contact with the underside of flange 21 when the cam 49 is rotated out of contact with the end of shaft 52. The tip 55 is moved out of engagement with flange 21 by rotating the cam member 49 into engagement with the top of shaft 52 to force the same downwardly and out of engagement with the underside of the flange.

*Operation*

The mode of operation of the described device is the following:

A cam drive is duplicated on the cam plotting apparatus by first adjusting the marking device 24 along arm 14 until the distance between the pivot point A and the center of the marking device B is equal to the length of the follower arm of the cam drive being duplicated. The mounting member 12 is then adjusted along slots 12a and with reference to the center M until the distance between the center M and the pivot point A equals the actual distance between the center of the cam and the pivot point of the follower arm of the cam drive being duplicated. The indexing assembly is moved along slots 21a, the same distance and in the same direction as the pivot point A of mounting block 12 so that the length of arm 14 and the radius of the scale arc will be equal in length thereby retaining the necessary relationship between pivot point A and the scale to indicate percent of travel of the marking device as the arm 14 is oscillated about pivot point A.

The next step of the adjusting of the distance between the center of rotation B of the marking device 24 and the marking tip 39 to equal the radius of the cam follower that will be used with the finished cam. Dwell circles are then drawn on the cam blank, which is clamped to the plate 3, and by means of the dwell circles the scale 18 is set according to the displacement diagram constructed for the cam being plotted.

The plate 3 and the cam blank thereon are now rotated by means of the friction wheel 9 until the 0° position, indicated on the edge of the plate, is at the starting point indicated on the vernier assembly. The indicator 15 is then set on the scale 18 to the position indicated by the deflection diagram for 0° angular position thereby positioning the marking device at the proper point over the cam blank. The marking device being properly positioned is now depressed by use of the crank 43 until the tip 39 is in contact with the surface of the cam blank and the cylindrical member 26 is rotated by means of the handle 43 to mark a circle on the cam blank that is equal in diameter to the diameter of the follower roller to be used with the finished cam. This procedure is followed for each value indicated on the deflection diagram until the cam blank has gone through a full 360° rotation. The inner envelope of the roller circles on the blank represents the cam contour indicated by the deflection diagram.

While the foregoing is a description of the preferred embodiment, the following claims are intended to include those modifications and variations that are within the spirit and scope of my invention.

I claim:
1. A cam drive simulating apparatus for plotting oscillating follower roller positions on a cam blank comprising, a base member, a plate rotatably disposed on said base member and adapted to have a cam blank secured thereto, said plate having a calibrated scale thereon for indicating angular orientation thereof, a mounting member adjustably secured to said base and having an arm pivotally attached thereto for movement in an arcuate path, indexing means adjustably secured to said base member and provided with a reference scale calibrated along an arc corresponding to said arcuate path of said arm, said mounting member and said indexing means being disposed for adjustable parallel movement radially of said plate for maintaining the relative positions thereof during the adjustment of said mounting member and said indexing means, an indicator mounted on the distal end of said arm for cooperation with said indexing means to angularly locate roller positions on said cam, and a marking device attached to said arm to mark the roller positions on said cam.

2. Apparatus as claimed in claim 1 wherein said marking device comprises a housing, a first member rotatably mounted therein and marking means attached to said first member offset from the center of rotation thereof.

3. Apparatus as claimed in claim 2 wherein said marking means is attached to a second member offset from the center of rotation thereof, said second member being rotatably mounted in the first member for the adjustment of the distance between the center of rotation of said first member and the longitudinal axis of the marking means.

4. Apparatus as in claim 1 wherein said marking device comprises a hollow cylindrical housing having one end thereof open and the other end closed, said closed end having a central opening formed therein, a collar attached to said housing, a first member rotatably mounted in said housing and being retained therein by said collar, said first member having an axial bore formed in one face offset from the axis of rotation thereof, a shaft extending centrally from the other face of said first member and through the central opening in said closed end of the housing, a crank attached to the free end of said shaft for rotating said shaft and first member, a spring mounted on said shaft between the crank and the housing to normally urge the first member into contact with the underside of said housing, and marking means mounted in said axial bore whereby rotation of said first member will cause the marking means to move along a circular path.

5. Apparatus as set forth in claim 4 wherein said collar is provided with an internal shoulder intermediate the ends thereof and said first member is provided with an external shoulder around the periphery thereof, said collar and said first member being so disposed that relative axial movement therebetween is limited by contact of said external and internal shoulders.

6. Apparatus as set forth in claim 4 wherein the collar is provided with an outwardly extending flange, said flange being disposed for movement into contact with said housing thereby adapting said marking device for removable attachment to a base member.

7. Apparatus as set forth in claim 4 wherein said marking means comprises a marking point eccentrically mounted in a cylindrical member, said cylindrical member being adjustably mounted in said axial bore in said first member whereby the marking point can be adjusted to move along any one of several selected circular paths.

References Cited by the Examiner
UNITED STATES PATENTS

| | | | |
|---|---|---|---|
| 1,256,461 | 2/1918 | Foster | 33—27 |
| 1,284,884 | 11/1918 | Foster | 33—27 |
| 1,402,961 | 1/1922 | Ratcliff | 33—27 |
| 1,442,926 | 1/1923 | Dezell | 33—27 |
| 1,542,582 | 6/1925 | Raiche | 33—27 |
| 2,455,372 | 12/1948 | Leeper | 33—27 |
| 2,973,696 | 3/1961 | Hecht | 33—27 X |

ISAAC LISANN, *Primary Examiner.*

H. N. HAROIAN, *Assistant Examiner.*